T. P. REDDIN.
POWER TRANSMISSION.
APPLICATION FILED OCT. 11, 1918.
1,399,879.
Patented Dec. 13, 1921.
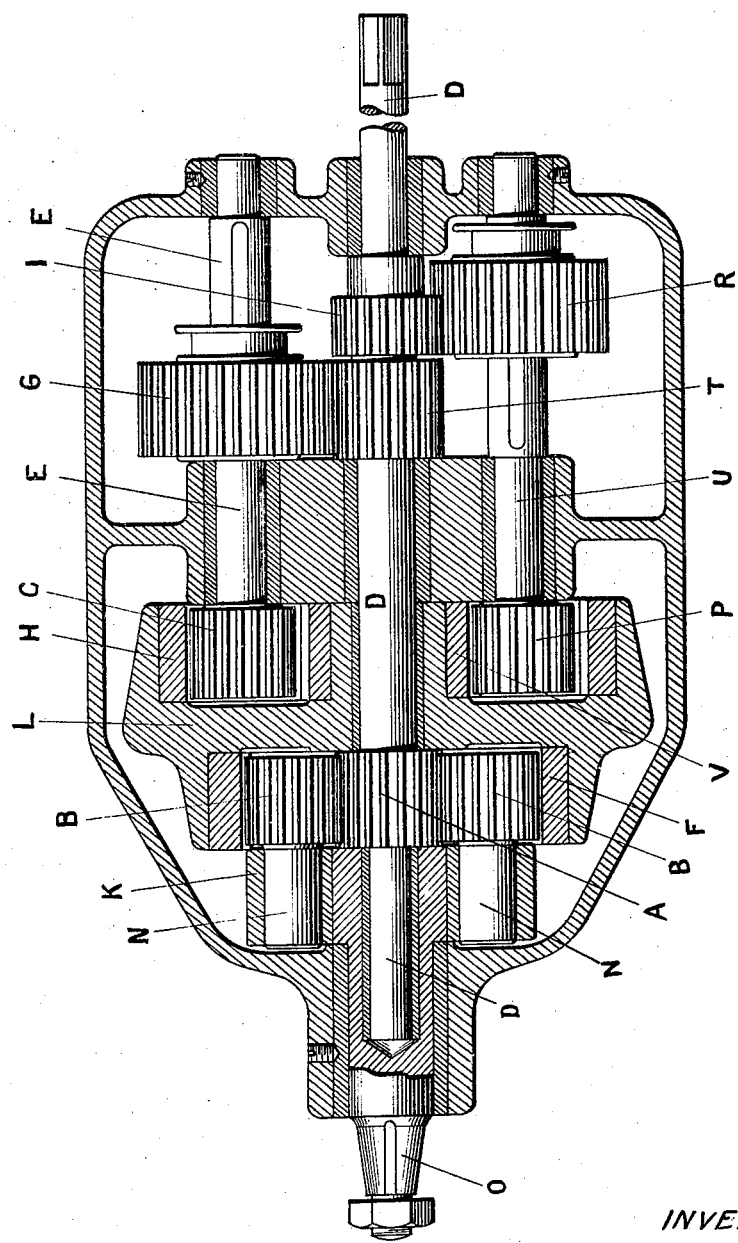
INVENTOR,
Thomas P. Reddin
BY
ATTORNEY.

UNITED STATES PATENT OFFICE.

THOMAS PAUL REDDIN, OF BRIDGEPORT, CONNECTICUT.

POWER TRANSMISSION.

1,399,879.     Specification of Letters Patent.     Patented Dec. 13, 1921.

Application filed October 11, 1918. Serial No. 257,690.

*To all whom it may concern:*

Be it known that I, THOMAS P. REDDIN, a citizen of the United States, residing at Bridgeport, in the county of Fairfield and State of Connecticut, have invented certain new and useful Improvements in Power Transmission, of which the following is a specification.

My invention relates to an improvement in power transmission mechanism, and the object is to provide means for regulating the speed of intermediate gears when said intermediate gears revolve in a circular path, by means of suitable gearing connected with the prime moving shaft and with the gear which revolves in the path of rotation of the intermediate gears.

The accompanying drawing is a sectional view through the power transmission and its casing.

D is the driving shaft which receives its power from an engine, or other source. Fastened to shaft D by means of keys, or other suitable devices, are the gears T and A. I is a loose gear which revolves freely upon shaft D.

O is the final driven shaft, which transmits the power to the wheels of a vehicle, or to any other device. The bracket K is keyed, or otherwise fastened, forming an integral part of the shaft O. This bracket K serves as a support for the two studs N, N. The studs N, N are a tight fit in the holes in the bracket. The shaft O, bracket K, and the studs N, N act as an integral member of the device. The shaft O is recessed for a bearing for the spigot end of the shaft D.

The studs N, N extend through the centers of the intermediate gears B, B. The gears B, B revolve freely upon the studs N, N.

L is a drum which serves as a support and driving member for the two large internal gears F and H and the spur gear V. The internal gears F and H and the spur gear V are keyed, or otherwise fastened, to the drum L. The drum L and its gears revolve freely upon the shaft D.

The spur gears C and G are keyed, or otherwise fastened, to the shaft E. The spur gears P and R are keyed, or otherwise fastened, to the shaft U. The spur gears G and R can be moved endwise along shafts E and U by means of forked rods (not shown). The shafts E and U are rotatably supported in bearings in the casing S.

The intermediate gears B, B revolve upon their own centers and in a circular path around the spur gear A.

The operation is as follows:—

Power is transmitted from the shaft D and the spur gear A to the intermediate gears B, B. The intermediate gears B, B, when in motion drive the shaft O. The reaction of gears B, B, is taken by the gear F. The speed of gear F is regulated by means of internal gear H, and spur gears C, G and T when G is in mesh with T, and R is out of mesh with T. The speed of gear F is regulated by gears V, P, R and T, when R is in mesh with T, and G is out of mesh with T.

The speed of the shaft O is dependent upon the speed of gear F. Gears G and R may be slid along their respective shaft E or U. Only one of the gears, either G or R can be in mesh with T at the same time. When G or R are in mesh with the idle gear I they have no effect upon the mechanism.

I claim:

A power transmission having alined driving and driven shafts and jack shafts parallel thereto, planet pinions carried by said driven shaft, and geared to said driving shaft, gears carried by said jack shafts, and a compound sun and orbit gear meshing with said planet pinions and with the gears on said jack shafts, said driving shaft being alternatively geared to said jack shafts.

In testimony whereof I affix my signature.

THOMAS PAUL REDDIN.